(12) United States Patent
Henglein et al.

(10) Patent No.: US 7,413,599 B2
(45) Date of Patent: Aug. 19, 2008

(54) COATED PEARLESCENT PIGMENTS WITH $SIO_2$ AND CERIUM OXIDE

(75) Inventors: Frank Henglein, Nuremberg (DE); Ulrich Schmidt, Hersbruck (DE); Peter Krüger, Schnaittach (DE); Günter Kaupp, Neuhaus (DE)

(73) Assignee: Eckart GmbH & Co. KG, Furth (DE)

( * ) Notice: Subject to any disclaimer, the term of this patent is extended or adjusted under 35 U.S.C. 154(b) by 120 days.

(21) Appl. No.: 11/213,234

(22) Filed: Aug. 26, 2005

(65) Prior Publication Data

US 2006/0042509 A1 Mar. 2, 2006

Related U.S. Application Data

(60) Provisional application No. 60/606,567, filed on Sep. 1, 2004.

(30) Foreign Application Priority Data

Aug. 26, 2004 (DE) .................. 10 2004 041 586

(51) Int. Cl.
   *C09C 1/00* (2006.01)
(52) U.S. Cl. .................. 106/415; 106/436; 106/416
(58) Field of Classification Search .......... 106/415, 106/416, 417, 436
   See application file for complete search history.

(56) References Cited

U.S. PATENT DOCUMENTS

| | | | | |
|---|---|---|---|---|
| 5,022,923 A * | 6/1991 | Rau et al. | ........... | 106/415 |
| 5,472,491 A * | 12/1995 | Duschek et al. | ........... | 106/418 |
| 5,730,796 A * | 3/1998 | Brand et al. | ........... | 106/446 |
| 5,759,255 A * | 6/1998 | Venturini et al. | ........... | 106/418 |
| 5,873,934 A * | 2/1999 | Kunii et al. | ........... | 106/417 |
| 6,176,918 B1 * | 1/2001 | Glausch et al. | ........... | 106/415 |
| 6,458,197 B1 * | 10/2002 | Vermoortele et al. | ........... | 106/479 |
| 6,488,758 B2 * | 12/2002 | Glausch et al. | ........... | 106/417 |
| 2002/0096087 A1 * | 7/2002 | Glausch | ........... | 106/415 |

FOREIGN PATENT DOCUMENTS

| | | |
|---|---|---|
| DE | 2106613 | 8/1971 |
| DE | 3535818 A1 | 4/1987 |
| DE | 42 07 723 A1 | 9/1993 |
| DE | 196 18 569 A1 | 11/1997 |
| DE | 196 39 783 A1 | 4/1998 |
| EP | 0141174 | 8/1987 |
| EP | 0 342 533 B1 | 4/1993 |
| EP | 0 632 109 B1 | 8/1998 |
| EP | 0 870 730 A1 | 10/1998 |
| EP | 0 649 886 B1 | 8/1999 |
| EP | 0 888 410 B1 | 4/2002 |
| EP | 1 203 795 A1 | 5/2002 |
| EP | 1 084 198 B1 | 7/2002 |
| EP | 0 881 998 B1 | 6/2004 |

* cited by examiner

*Primary Examiner*—J. A. Lorengo
*Assistant Examiner*—Shuangyi Abu-Ali
(74) *Attorney, Agent, or Firm*—Synnestvedt & Lechner LLP

(57) ABSTRACT

The invention relates to pearlescent pigments with a platelet-shaped substrate comprising metal oxide and having a first and a second protective layer, said metal oxide having a refractive index of greater than 1.8, there being on the platelet-shaped substrate a first protective layer comprising cerium oxide and/or cerium hydroxide and a second protective layer of $SiO_2$, applied to which is an organic chemical aftercoat comprising at least one silane having at least one functional bond group and at least one silane without a functional bond group, it being possible for metal oxide layers other than cerium oxide and $SiO_2$ to be disposed between the first and the second protective layer. The invention further relates to a process for preparing these pigments, and to the use thereof.

23 Claims, No Drawings

COATED PEARLESCENT PIGMENTS WITH SIO$_2$ AND CERIUM OXIDE

CROSS REFERENCE TO RELATED APPLICATIONS

This application claims priority under 35 U.S.C. § 119(e) of U.S. Provisional Patent Application No. 60/606,567 filed on Sep. 1, 2004, and of German Patent Application No. 102004041586.2, filed on Aug. 26, 2004, the contents of which are hereby incorporated by reference.

The invention relates to pearlescent pigments having a platelet-shaped substrate comprising metal oxide and having a first and a second protected layer, said metal oxide having a refractive index of greater than 1.8. The invention further relates to a process for preparing such pearlescent pigments and also to the use thereof.

Pearlescent pigments which comprise titanium dioxide in the top layer or which are constructed from particulate TiO$_2$ possess a certain photocatalytic activity. If, then, UV light acts on a pearlescent pigment in the presence of water and oxygen, the UV activity of the pearlescent pigment may trigger accelerated degradation of organic compounds: a binder matrix, for example. Even the UV fraction present in daylight may cause this reaction; i.e., for applications such as automotive finishes, which are exposed directly to weathering, it is necessary to use pearlescent pigments which have been specially stabilized. In order to counter this effect, which is deleterious for exterior application, pearlescent pigments can be furnished with a variety of protective coatings in order to reduce the photoactivity.

EP 0 141 174 describes pearlescent pigments of improved weathering stability which have a protective coating composed essentially of a rare earth metal compound—cerium, for example—and a polysiloxane. Furthermore, the protective coating—application of which takes place in an aqueous suspension—may also include zinc salts and/or aluminum salts or else silicate. Coating here a mixture containing preferably less than 50% by weight of water.

Examples of organic solvents used include ethers, esters, alcohols, ketones, aldehydes or white spirit.

As predominantly organic solvent mixtures it is preferred to use alcoholic solvents having an alcohol fraction of 50% to 99% by weight. The alcohol fraction is preferably 60% to 95% and more preferably 70% to 90% by weight. Below an alcohol fraction of 50% the performance properties of the coated pearlescent pigments may be impaired, so that in the case of a coating there may be a loss of luster. Above 99%, finally, the reaction mixture apparently contains too little water, since the yields of SiO$_2$ are poor and the reaction times are too long.

Suitable alcohols themselves include, for example, methanol, ethanol, n-propanol, isopropanol, n-butanol, 2-methylpropanol, 2-methoxypropanol, butyl glycol, etc. Also possible are mixtures of these alcohols in any desired proportions. The residual fraction of the mixture is made up on the one hand of the water reaction partner; on the other hand, further organic solvents may be present.

The advantage associated with using predominantly organic solvents, particularly in step (e), lies in the very good solubility of many silanes in organic solvents. As a result it is possible to use not only hydrophilic silanes but also, in particular, hydro-phobic silanes for the surface modification. In aqueous solutions, in contrast, many silanes are not soluble. In that case the remedy employed is that of controlled prehydrolysis of the silanes [U.S. Pat. No. 5,759,255] or of the synthesis of specific water-soluble oligomer systems [DE 196 39 793]. Prehydrolyzed silane systems, however, itself takes place in an aqueous suspension and the product, following its isolation, is dried.

EP 0 342 533 discloses zirconium oxide-coated pigments to which it is possible to apply a layer composed of a hydrated metal oxide of cobalt, manganese or cerium. The pigment thus treated is then said to be highly suitable for use in non-aqueous coating systems; for water-thinnable coating materials, however, it continues to be unsuitable, in accordance with EP 632 109, since it causes the formation of microblisters in the coating film.

According to the teaching of EP 0 632 109 a three-ply protective layer is applied to a platelet-shaped substrate coated with metal oxides. In a 1st stage SiO$_2$ is applied, in a 2nd stage a hydroxide or oxide hydrate of cerium, aluminum or zirconium is applied, and in a 3rd stage at least one hydroxide or oxide hydrate of cerium, aluminum or zirconium and also an organic coupling reagent are applied. Furthermore, the coupling reagents must be hydrolyzed prior to binding to the pigment surface; according to the teaching of EP 0 888 410 B1, only a maximum of 60% of the added coupling reagents can be bound to the pigment surface.

EP 0 888 410 B1 discloses modified pearlescent pigments based on a platelet-shaped substrate coated with metal oxides. According to the teaching of EP 0 888 410 B1 the top layer is composed of at least two oxides, oxide mixtures or mixed oxides of silica, alumina, cerium oxide, titanium oxide or zirconium oxide, and a water-based oligomeric silane system. No investigations are disclosed concerning the effect of the sequence of the oxidic protective layers in terms of their effectiveness on the UV stability of the pearlescent pigment. Consequently, no optimum protective-layer construction is described, either. Furthermore, the water-based oligomeric silane system can only comprise hydrophobic fractions up to a maximum of eight carbon atoms, since otherwise its water solubility is not assured. As a result, the possibility for variation of the aftercoat is limited here.

EP 0 649 886 provides pearlescent pigments with a titanium dioxide or iron oxide coating which are aftercoated in aqueous phase with a combination of cerium and aluminum oxide hydrates and are subsequently dried.

According to the teaching of EP 1 203 795 a pearlescent pigment can comprise a layered construction which in a first layer comprises oxide hydrates of silicon or of aluminum and in a subsequent, second layer comprises oxide hydrates of silicon, aluminum, zirconium or cerium, the composition of the 1st layer being different from that of the 2nd layer. The pearlescent pigment further comprises a third layer of at least one organic hydrophobic coupling reagent, said organic hydrophobic coupling reagent not reacting with the binder of, say, a coating system.

In the case of the majority of the processes used in the prior art, SiO$_2$ and/or alumina is applied as the first layer. A cerium oxide layer is generally applied subsequently or as a mixed oxide precipitation. The silanes are then attached, usually, in a coprecipitation with the oxide precipitation in aqueous solution. In view of the coprecipitation of the oxide and of the silane system, the efficiency of surface coverage with the oligomeric silane system is low. Accordingly, disproportionately large amounts of the expensive silanes are used, which unnecessarily increases the raw materials costs.

EP 1 084 198 B1 describes effect pigments which by virtue of their surface modification with reactive orientation agents exhibit very strong adhesion to the basecoat. EP 1 084 198 B1, however, does not disclose weather-stable and UV-stable pearlescent pigments.

It is an object of the invention to provide metal oxide-comprising pearlescent pigments having a simply constructive layered construction providing effective protection and representing an improvement on the prior art. The protective layered construction ought in particular to afford effective protection with respect to UV-light-induced photocatalytic activity of the pigment, without substantially impairing the optical properties such as luster. The pearlescent pigments of the invention ought to possess an improved weather stability.

The pearlescent pigments of the invention ought additionally to be provided with an organic chemical aftercoat which allows very good orientation behavior of the pearlescent pigments in the coating material in conjunction with outstanding attachment to the binder (very strong adhesion).

A further object is to provide a simple process for preparing metal oxide-comprising pearlescent pigments having a simple and effectively protective layered construction. A further aim is to find a simple process for effectively applying the aftercoat, one which exhibits great variability in respect of the aftercoating reagents that can be used.

The object on which the invention is based is achieved through the provision of a pearlescent pigment having a platelet-shaped substrate comprising metal oxide, said metal oxide having a refractive index of greater than 1.8, and having a first and a second protective layer. On the platelet-shaped substrate there is a first protective layer comprising cerium oxide and/or cerium hydroxide and a second protective layer of $SiO_2$, applied to which is an organic chemical aftercoat comprising at least one silane having at least one functional bond group and at least one silane without a functional bond group. In one inventive development it is possible for metal oxide layers other than cerium oxide and $SiO_2$ to be disposed between the first and the second protective layer.

Preferred developments are indicated in subclaims 2 to 18.

A platelet-shaped substrate comprising metal oxide comprises, for the purposes of the invention, in particular, pearlescent (or pearl luster) pigments comprising metal oxide: for example, metal oxide-coated mica flakes.

The cerium used is in trivalent or tetravalent form or in mixtures of these two forms.

The organic chemical aftercoat is not in the form of a mixed coat with the $SiO_2$ coating. This means that, when the second protective layer was applied, first $SiO_2$ was applied to the effect pigment and subsequently the organic chemical aftercoat was applied.

The organic chemical aftercoat may be realized extremely advantageously in a simple way and comprises a great diversity of surface modifiers. In view of the multiplicity of surface modifiers that can be used, the pigment of the invention can be made compatible with a very wide variety of coating systems. The optical properties such as luster are very good.

The process of the invention for providing the pearlescent pigment of the invention comprises the following steps:
  (a) suspending platelet-shaped substrate comprising metal oxide in a liquid phase, said metal oxide having a refractive index of greater than 1.8,
  (b) applying a layer comprising cerium oxide and/or cerium hydroxide to said platelet-shaped substrate,
  (c) optionally applying one or more metal oxide layers to the pigment coated in step (b),
  (d) applying an $SiO_2$ layer to the pigment coated in step (b) or step (c),
  (e) modifying the surface of the $SiO_2$ layer with an aftercoat comprising at least one silane having a functional bond group and at least one silane without a functional bond group.

Preferably step (e) here is carried out with one or more organofunctional silanes in a liquid phase having a predominant fraction of organic solvent. It is extremely advantageous in this context that numerous additives, particularly hydrophobic silanes, have very good solubility in predominantly organic solvents. The consequence is a simple operating regime and a great variability in the choice of surface modifiers.

Surprisingly it has now been found that excellent UV and weather stability is achieved in pearlescent pigments by means of a pearlescent pigment having a platelet-shaped substrate which comprises metal oxide and applied to which there is a first protective layer comprising a layer which is preferably applied directly to the platelet-shaped substrate and which comprises or consists of cerium oxide and/or cerium hydroxide, and, in the further layered construction, a layer of $SiO_2$ which possesses an organic chemical aftercoat.

Despite the low refractive index of $SiO_2$, the pigments surprisingly exhibit a very good luster, since even thin layers are adequate for high UV stability. This was by no means to have been expected, particularly since it is stated in DE 4207723 A1, p. 2, lines 19-21, that: "Pigments coated with silicate or with $Al_2O_3$ are difficult to disperse and additionally exhibit luster reductions in printing inks and paint coats."

The amount of cerium oxide/hydroxide used is preferably between 0.05% to 3.0%, more preferably between 0.1% and 1.0%, and very preferably between 0.2% and 0.7%, by weight, based in each case on the total weight of the pigment. The amount of cerium oxide/hydroxide used should preferably not be above 1.0% by weight, since otherwise losses in the optical quality of the pigment might be too great. Below 0.1%, on the other hand, the additional UV stabilization is generally not adequately pronounced. In any specific case, the cerium oxide/hydroxide amount will depend on the fineness and, hand in hand with this, on the specific surface area of the pearlescent pigment and on the thickness of the $TiO_2$ layer. Finer pigments and thicker $TiO_2$ layers generally also necessitate a higher cerium hydroxide/hydroxide content.

The $SiO_2$ content of the pearlescent pigments of the invention is preferably situated at a fraction of 0.5% to 8% of the pigment, preferably of 1% to 7% and more preferably of 2% to 5%, by weight, based in each case on the total weight of the pigment. Here again, in any specific case, the amount of $SiO_2$ will depend on the fineness and, hand in hand with this, on the specific surface area of the pearlescent pigment and on the thickness of the $TiO_2$ layer. Finer pigments and thicker $TiO_2$ layers generally likewise necessitate a higher $SiO_2$ content. Above 8% by weight of $SiO_2$, no further improvement at all is observed in the weather stability or UV stability. Oftentimes, indeed, the properties become poorer, probably because the thicker protective layers are brittle and cracks form more easily, which in turn allow the coated $TiO_2$ a higher level of photoactivity. Below 0.5% by weight, the protective effect of the $SiO_2$ layer is too low.

It is thought that the improved weather and UV stabilities of the pearlescent pigments of the invention are attributable inter alia to the optimum layer sequence of the two oxides. Cerium oxide/hydroxide is known per se to be a very effective oxide for suppressing the photochemical activity of $TiO_2$. The activity probably derives in particular from the known Ce(III)/Ce(IV) redox system. By means of this system, free radicals, which are generated on the surface of the $TiO_2$ as a result of its photochemical activity, can be effectively consumed by reaction. Apparently this reaction is particularly effective when cerium oxide/hydroxide is deposited as the very first layer with direct contact to the $TiO_2$ surface.

In the case of the present invention it is therefore preferred to apply the cerium oxide/hydroxide layer directly to the TiO$_2$ layer. The cerium oxide/hydroxide layer need not, however, be applied directly to the TiO$_2$ layer. The cerium oxide/hydroxide layer is preferably applied by sole precipitation, i.e., not as a coprecipitation, so that the cerium oxide/hydroxide layer is preferably substantially free from further metal oxides.

It is preferred, moreover, to apply the SiO$_2$ layer directly to the cerium oxide/hydroxide layer. With very great preference the SiO$_2$ layer is applied from a predominantly organic solvent mixture using sol-gel methods, as elucidated below.

The pigments of the invention therefore preferably have a protective layered construction comprising a cerium oxide and/or cerium hydroxide layer, directly following an SiO$_2$ layer, to which the specified surface modification with at least one silane having at least one functional bond group and at least one silane without a bond group is applied. This protective layered construction is preferably applied directly to a TiO$_2$ layer.

The following SiO$_2$ layer, i.e., the second protective layer, in each case constitutes a further barrier. It protects the surface of the pearlescent pigment from water penetration and, conversely, restrains any free-radical species that might possibly have passed through the cerium oxide/hydroxide layer.

The silicate layer may also, furthermore, have a stabilizing effect, presumably on the basis of its electronic nature. It is thought that the energy level of the band edges of SiO$_2$ in comparison to that of TiO$_2$ is of a favorable nature such that the transfer of both holes and electrons, which arise in the TiO$_2$ semi-conductor following absorption of UV photons, at the pigment interface is effectively suppressed ("diode effect").

Advantageous properties of the pearlescent pigments of the invention have been achieved not only on the basis of the optimized oxide layer construction described above. Surprisingly, further advantageous performance properties have been obtained by means of an organic chemical aftercoat of the SiO$_2$ layer, comprising at least one silane having at least one functional bond group and at least one silane without a functional bond group. Surprisingly the pearlescent pigment of the invention exhibits outstanding orientation behavior in the coating medium. The optical properties such as luster are very good.

A functional bond group here is a functional group which is able to enter into chemical interaction with the binder. This chemical interaction may consist of a covalent bond, a hydrogen bond or an ionic interaction.

The functional bond groups comprise acrylate, methacrylate, vinyl, amino, cyanate, isocyanate, epoxy, hydroxyl, thiol, ureido and/or carboxyl groups.

The choice of a suitable functional group depends on the chemical nature of the binder. Preferably a functional group which is chemically compatible with the functionalities of the binder is chosen, in order to allow effective attachment. This property is very important in respect of weather-stable and UV-stable pearlescent pigments, since in this way a sufficiently strong adhesion is provided between pigment and cured binder. This can be tested for in, for example, adhesion tests such as the cross-cut test under condensation test exposures in accordance with DIN 50 017. Scoring a pass in such a test represents a necessary condition for the use of weather-stable pearlescent pigments in an automotive finish.

The organofunctional silanes used preferably as surface modifiers, which contain suitable functional groups, are available commercially and are produced, for example, by Degussa, Rheinfelden, Germany and sold under the trade name "Dynasylan®". Further products can be purchased from OSi Specialties (Silquest® silanes) or from Wacker (Genosil® silanes).

Preferred examples of silanes that can be used are 3-methacryloyloxypropyltrimethoxysilane (Dynasylan MEMO, Silquest A-174NT), vinyltri(m)ethoxysilane (Dynasylan VTMO or VTEO, Silquest A-151 or A-171), 3-mercaptopropyltri(m)ethoxysilane (Dynasylan MTMO or 3201; Silquest A-189), 3-glycidyloxypropyltrimethoxy-silane (Dynasylan GLYMO, Silquest A-187), tris(3-trimethoxysilylpropyl) isocyanurate (Silquest Y-11597), gamma-mercaptopropyltrimethoxysilane (Silquest A-189), bis(3-triethoxysilylpropyl) polysulfide (Silquest A-1289), bis(3-triethoxysilyl) disulfide (Silquest A-1589), beta(3,4-epoxycyclohexyl)ethyltri-methoxysilane (Silquest A-186), gamma-isocyanatopropyl-trimethoxsilane (Silquest A-Link 35, Genosil GF40), (methacryloyloxymethyl)trimethoxysilane (Genosil XL 33) and (isocyanatomethyl)trimethoxysilane (Genosil XL 43).

In one preferred embodiment the organofunctional silane mixture that modifies the SiO$_2$ layer comprises, in addition to at least one silane without a functional bond group, at least one amino-functional silane. The amino function is a functional group which is able to enter into chemical interactions with the majority of groups present in binders. This interaction may involve a covalent bond, such as with isocyanate or carboxylate functions of the binder, for example, or hydrogen bonds such as with OH or COOR functions, or else ionic interactions. It is therefore very highly suitable for the purpose of the chemical attachment of the effect pigment to different kinds of binder.

The following compounds are employed preferably for this purpose:
aminopropyltrimethoxysilane (Dynasylan AMMO; Silquest A-1110), aminopropyltriethoxysilane (Dynasylan AMEO) or N-(2-aminoethyl)-3-aminopropyltrimethoxysilane (Dynasylan DAMO, Silquest A-1120) or N-(2-aminoethyl)-3-aminopropyltriethoxysilane, triamino-functional trimethoxysilane (Silquest A-1130), bis(gamma-trimethoxysilylpropyl)amine (Silquest A-1170), N-ethyl-gamma-aminoisobutyltrimethoxysilane (Silquest A-Link 15), N-phenyl-gamma-diaminopropyltrimethoxysilane (Silquest Y-9669), 4-amino-3,3-dimethylbutyltrimethoxy-silane (Silquest Y-11637), (N-cyclohexylaminomethyl)-triethoxysilane (Genosil XL 926), (N-phenylaminomethyl)-trimethoxysilane (Genosil XL 973), and mixtures thereof.

In one further-preferred embodiment the silane without a functional bond group is an alkylsilane. The alkylsilane preferably has the formula (I):

$$R_{(4-z)}Si(X)_z \qquad (I)$$

In this formula z is an integer from 1 to 3, R is a substituted or unsubstituted, unbranched or branched alkyl chain having 10 to 22 carbon atoms, and X is a halogen and/or alkoxy group. Preference is given to alkylsilanes having alkyl chains with at least 12 carbon atoms. R may also be joined cyclically to Si, in which case z is usually 2.

A silane of this kind produces strong hydro-phobicization of the pigment surface. This in turn leads to the pearlescent pigment thus coated tending to float to the top in the varnish coating. In the case of platelet-shaped effect pigments, a behavior of this kind is referred to as "leafing".

Entirely surprisingly it has now been found that a silane mixture composed of at least one silane which possesses at least one functional group which allows attachment to the binder and a sparingly water-soluble or water-insoluble alkylsilane without an amino group as described above allows optimum performance properties on the part of the pearlescent pigments.

The pearlescent pigments are bound so effectively to the coating material that there is no loss of adhesive strength. On the other hand, the pigments exhibit an outstanding plane-parallel orientation in the varnish, and also a "residual leafing" behavior; in other words, a statistically measurable fraction of the pigments is located in the upper region of the cured basecoat in the vicinity of the clearcoat. Normally, an arrangement of the pigments at the upper interface of the basecoat leads to a loss of adhesion properties, since, because of its platelet-shaped structure, the pearlescent pigment acts as a disruptive barrier between clearcoat and basecoat. In the case of the present invention, surprisingly, the pigments arrange themselves not at the upper interface of the basecoat but only in the vicinity of the upper boundary of the basecoat, thereby allowing reliable attachment of the clearcoat to the basecoat. In other words, advantageously, the pigments of the invention do not act as a disruptive barrier.

This residual leafing behavior and the very good plane-parallel orientation produce improved luster properties and a high cleanness of hue of the pearlescent pigments of the invention in, for example, a coating system.

At an alkylsilane chain length of less than 10 carbon atoms, the hydrophobicization of the surface is not sufficient to exhibit such effects. It is thought that, in this case, it is not possible for there to be any segments developed on the pigment surface in which the alkyl chains are arranged in parallel to one another in the manner of a "self-assembly monolayer". Layers of this kind are obtained preferentially if a surface is coated with additives which have an anchor group to the surface and alkyl chains having at least 10 carbon atoms.

Where the silanes possess more than 22 carbon atoms, the attachment to the binder system through the silane with functional attachment groups is generally no longer good enough; in other words, adhesion problems are observed in the condensation test in accordance with DIN 50 017.

In a further preferred embodiment the surface modification comprises silanes of the structural formula (II)

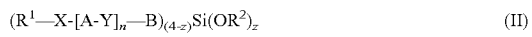

where
n=1 to 100,
z is an integer from 1 to 3,
$R^1$ is straight- or branched-chain alkyl having 1 to 12 carbon atoms, which may be substituted by halogens; is aryl having 6 to 12 carbon atoms; or is aryl having 6 to 12 carbon atoms, which may be substituted by alkyl having 1 to 6 carbon atoms and/or by halogens;
$R^2$ is straight- or branched-chain alkyl having 1 to 6 carbon atoms;
A and B independently of one another are a divalent group consisting of straight- or branched-chain alkylene having 1 to 12 carbon atoms; arylene having 6 to 12 carbon atoms; or arylene having 6 to 12 carbon atoms, which may be substituted by alkyl having 1 to 6 carbon atoms and/or by halogens; and
X and Y independently of one another are O or S. Halogen here is F, Cl, Br and/or I.

In preferred embodiments $R^1$ and $R^2$ independently of one another are methyl, ethyl, n-propyl, isopropyl, n-butyl, isobutyl, tert-butyl, phenyl, biphenylyl, naphthyl, or mixtures thereof.

In further-preferred embodiments A and B independently of one another are composed of ethylene, propylene, 1-butylene, 2-butylene, phenylene, phenylene substituted by alkyl having 1 to 6 carbon atoms, and mixtures thereof.

These silanes may be in pure form with defined n or in mixtures with different n.

According to one preferred embodiment n is in a range from 1 to 20, more preferably from 5 to 15.

In one particularly preferred embodiment the surface modification comprises silanes of the formula (III)

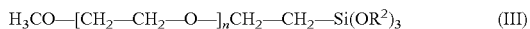

where n=1 to 100, preferably 1 to 20, more preferably 5 to 25, and $R^2$ has the same definition as indicated above. With particular preference $R^2$ independently at each occurrence is methyl or ethyl.

These silanes too may be present in pure form with a defined n or in mixtures (different n). By virtue of their oxyethylene group(s) within the chain, silanes of this kind have particularly good wetting and dispersing properties. Such silanes are available from OSi Specialties under the product name Silquest® A-1230.

Prior to application to the $SiO_2$ layer the organo-functional silanes are preferably in predominantly monomeric form.

The amount of the silanes applied as an aftercoat in relation to the total pearlescent pigment coated with cerium oxide and $SiO_2$ is preferably 0.1% to 6%, more preferably 0.2% to 3%, and very preferably 0.3% to 2.0%, by weight. In any specific case it is also possible here for the amount to depend on the fineness and specific surface area of the pearlescent pigment. Generally speaking, however, an amount in the order of magnitude of a silane monolayer on the pigment surface is sufficient. Excessively small amounts lead to inadequate coating of the pigment surface and, consequently, to poor condensation test results in coatings applications (test according to DIN 50 017).

The mixing ratio of the silanes containing at least one functional bond group and the silanes containing no functional bond group to one another (based on weight ratios) is preferably 1:5 to 5:1, more preferably 1:3 to 3:1, and very preferably 1:2 to 2:1. If the silane mixture overall contains too few functional bond groups, the surface modification becomes too hydrophobic, and adhesion problems are obtained in the course of an exposure test such as the condensation test of DIN 50 017. In the case of an excess of functional bond groups, in contrast, the surface is too hydrophilic and the pasting behavior of the pigment in a water-based varnish, and also the orientation of the pearlescent pigments in the cured coating application, are poorer.

In the case of a further inventive embodiment, the pearlescent pigment to be stabilized is coated with a mixed layer of cerium oxide/cerium hydroxide and $SiO_2$ as the first protective layer. The cerium employed is in trivalent or tetravalent form or in mixtures of these two forms. Preference, however, is given to a sequence of cerium oxide/cerium hydroxide first and then $SiO_2$, since this brings a higher UV stability.

A further inventive embodiment involves the platelet-shaped substrate having one or more metal oxide layers, preferably a layer of tin oxide. The layer of tin oxide can be applied as described for example in examples 1 and 5 of DE 3535818 A1, hereby incorporated by reference. This layer is preferably applied during the actual operation of producing the substrate, and calcined subsequently. Tin oxide is used in the preparation of pearlescent pigments in order to induce a rutile structure in a $TiO_2$ layer precipitated onto mica. $TiO_2$ grows on mica in an anatase structure, which because of its higher photoactivity is unwanted. Coating the mica with $SnO_2$, however, induces a rutile modification of the subsequent $TiO_2$ layer, since the two oxides have a similar crystal structure.

It has now surprisingly been found that an additional coating with $SnO_2$ after a $TiO_2$ coating, i.e., before the first protective layer with cerium oxide/cerium hydroxide and the second protective layer of $SiO_2$ are applied, further increases the weather stability. The $SnO_2$ layer here is preferably applied directly to the $TiO_2$ layer.

In further inventive embodiments it is possible for further layers, preferably metal oxide layers, to be disposed between the first protective layer of or with cerium oxide and/or cerium hydroxide and the second protective layer of $SiO_2$. These metal oxides are preferably $ZrO_2$.

As a platelet-shaped substrate which is provided, in accordance with the invention, with the protective layer it is preferred to use the following substrates:

$TiO_2$ and/or iron oxide coated mica flakes,
$TiO_2$ and/or iron oxide coated glass flakes,
$TiO_2$ and/or iron oxide coated alumina flakes,
$TiO_2$ and/or iron oxide coated $SiO_2$ flakes,
bismuth oxychloride flakes,
pure $TiO_2$ flakes, and mixtures of all of these substrates.

In order to produce a good pearl luster effect the refractive index of the metal oxide layer is greater than 1.8, preferably greater than 2.2, more preferably greater than 2.3, more preferably still greater than 2.4, and very preferably 2.5 or more.

Preferably, in the context of the present invention, substrates coated with $TiO_2$ are provided with the protective layer described above. Mica pigments coated with $TiO_2$ and/or iron oxide are available commercially, for example, under the name Phoenix® (Eckart). $TiO_2$-and $Fe_2O_3$-coated $Al_2O_3$ flakes are supplied under the trade name Xirallic®, and correspondingly coated $SiO_2$ flakes under the trade name Colorstream®, by Merck. Additionally, multilayer interference pigments, as described for example in DE 19618569, composed of a support material coated with alternating layers of metal oxides of low and high refractive index, can be aftercoated in accordance with the invention.

The aforementioned pigments can be stabilized to outstanding effect with respect to the UV-light-induced photocatalytic activity first with a first protective layer of or with cerium oxide/hydroxide and then with a second protective layer of $SiO_2$, with subsequent organic chemical aftercoating.

In the process of the invention, after step (e), the pigment can be separated from the solvent and, if desired, dried. It is also possible, if necessary, for classification operations to follow.

The cerium oxide layer is precipitated preferably at reaction temperatures from room temperature to the boiling temperature of the solvent and, if desired, in the presence of a catalyst.

In one preferred version of the process of the invention the liquid phase in step (a) is a predominantly organic solvent mixture. With further preference the entire coating operation, (b) to (e), of the pearlescent pigment is carried out in a predominantly organic solvent mixture or in a liquid phase having a predominant fraction of organic solvent. By a predominantly organic solvent mixture is meant lack any great storage life. As a result of further hydrolysis or condensation processes, the silanes may undergo further crosslinking, may undergo oligomerization, and may finally become unusable for the purpose of surface modification. Water-soluble oligomer systems, finally, must first be synthesized, which is costly and inconvenient; they are likewise relatively difficult to store, and are restricted in the diversity of possible variations of the organofunctional groups. Alkylsilanes having 10 to 22 carbon atoms, in particular, are insoluble or only sparingly soluble in water. In contrast, apolar alkylsilanes of this kind can be dissolved without problems in the solvents used here, which is beneficial to the formation of layers on the pigment surface. In addition it is possible to deploy the relatively expensive silanes efficiently.

Aminosilanes, in contrast, are indeed generally soluble in water, but undergo autocatalytic hydrolysis and condensation to form oligomeric and polymeric systems. Their storage stability in water is therefore restricted.

As a result of the greater number of silanes available as surface modifiers, the surface properties of the pearlescent pigments of the invention can be adapted in a variable manner to the different coating systems. In contrast, in the case of prehydrolyzed silanes and particularly in the case of water-soluble silane oligomers, the formulator is restricted to short-chain aliphatic or aromatic radicals having not more than 8 carbon atoms.

Steps (a) to (e) of the process described are preferably carried out in the same liquid medium. In the case of this embodiment, cerium salts sufficiently soluble in predominantly organic solvent are used for step (c).

Preferred examples for this purpose are cerium(III) acetate, cerium(III) octoate, cerium(III) acetyl-acetonate, cerium(III) nitrate or cerium(III) chloride.

The $SiO_2$ layer is preferably applied by a sol-gel method in predominantly organic solvent. In this case, in step (d), the $SiO_2$ layer is applied using, preferably, tetraalkoxysilane, with optional addition of water. Sol-gel processes of this kind, carried out in a predominantly organic solvent mixture, have advantages over the deposition of $SiO_2$ from aqueous silicate solutions, as described in the prior art. Modern binder systems are very sensitive in respect of the presence of salts. These salts, for example, disrupt the colloidal stability of binder particles and may therefore induce uncontrolled coagulation of the binder system of a coating material. As a result, the coating material becomes unusable. Moreover, water-soluble constituents such as salts promote osmotic processes in coating systems, and so, as a result of accumulation of water in the coating film, there may be blistering and delamination problems. A salt-free or low-salt preparation process for a pearlescent pigment removes the need for costly and inconvenient purification steps. In other words, following slurrying, the conductivities of the pigments of the invention are lower than is otherwise usually the case.

The predominant by-product of the reaction comprises alcohols, which can be worked up together with the alcoholic solvent by a distillation, for example, and can be recycled.

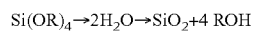
$$Si(OR)_4 \rightarrow 2H_2O \rightarrow SiO_2 + 4\ ROH$$

A further advantage lies in the use of a monomeric starting material for preparing the $SiO_2$ layer. In the case of the sol-gel process in organic solvent, the reaction begins with the hydrolysis of the tetraalkoxysilane, i.e., a molecular monomer. Aqueous silicate solutions such as waterglass, in contrast, are always in an oligomeric form of precondensed —O—Si—O— units. In the case of the sol-gel process which is used with preference in accordance with the invention, therefore, the hydrolysis step and also the subsequent condensation can be controlled more effectively. This is beneficial for the quality and morphology of the layer formed. The controlled deposition of the $SiO_2$ in the sol-gel process in predominantly organic solvent mixture is thought also to be responsible for the high quality of the layer and the resultant very good barrier effect.

As starting compounds for the SiO$_2$ layer it is preferred to use tetraalkoxysilanes. Examples thereof include the following: tetramethoxysilane, tetra-ethoxysilane, tetrapropoxysilane, tetraisopropoxysilane or tetrabutoxysilane, or mixtures thereof.

The catalysis of the sol-gel process for SiO$_2$ deposition takes place preferably in a basic medium. Catalysts used are preferably nitrogen-containing bases. Examples thereof include ammonia, hydrazine, methylamine, ethylamine, triethanolamine, dimethylamine, diethylamine, methylethylamine, trimethylamine, triethylamine, ethylenediamine, trimethylenediamine, tetramethylenediamine, 1-propylamine, 2-propylamine, 1-butylamine, 2-butylamine, 1-propylmethylamine, 2-propylmethylamine, 1-butylmethylamine, 2-butylmethylamine, 1-propylethylamine, 2-propylethylamine, 1-butylethylamine, 2-butylethylamine, piperazine, and pyridine.

The preferred version of the process of the invention, as described here, is notable for a one-pot process in which the organic chemical aftercoating takes place immediately following the coating with cerium oxide/hydroxide and subsequently SiO$_2$. The silanes are added directly, i.e., without prehydrolysis, to the reaction solution, undergo hydrolysis in situ, and condense, finally, with hydroxyl groups of the SiO$_2$ layer, so that covalent attachment to the pigment surface takes place. This gives rise to an extremely simple operating regime in conjunction with a very good selection of silanes that can be used.

In a further version of the process of the invention, following application of the cerium oxide/hydroxide coating from aqueous solution, the SiO$_2$ coating operation can also take place from silicate solutions in an aqueous medium. The conditions for depositing cerium or silicate compounds from aqueous solution are described for example in example 2, lines 30-37 of EP 0141174 or in example 1 of EP 649886 B1 and also in example 1 of DE 4207723 or in example 1 of DE 2106613, which are hereby incorporated by reference. Subsequently, if desired, a calcining step can be carried out. The conditions necessary for such a step are known per se to the skilled worker and can be found for example in DE 2106613 or DE 3535818.

A further version of the process of the invention for preparing the pigments of the invention with a further metal oxide layer on the substrate comprises applying this layer during the actual operation of producing the substrate and subsequently, if desired, calcining it. The details in this regard are known to the skilled worker and can be found for example in DE 2106613 or DE 3535818.

A further process for preparing the pigments of the invention with a further metal oxide layer between the layer of cerium oxide/cerium hydroxide and the SiO$_2$ layer comprises precipitating this metal oxide layer following the application of the cerium oxide/cerium hydroxide layer. This metal oxide layer precipitation may take place either in predominantly organic solvent mixture or in aqueous solution.

The pearlescent pigments of the invention are used preferably in varnishes, powder coatings, printing inks, plastics, and coatings.

The coated pearlescent pigments of the invention find use in particular as weatherfast pearlescent pigments in automotive finishes and also in powder coatings and coatings for exterior applications.

With great advantage the pearlescent pigments of the invention allow the provision of single-coat UV-stable and weather-stable varnish or coating systems which require no subsequent clearcoat or protective coat to be applied.

The object on which the invention is based is further achieved by an article with a coating comprising pearlescent pigment as claimed in any one of claims 1 to 18. According to one preferred development of the invention said article is a vehicle body, preferably a motor vehicle body, or an architectural facing, a facing element for example.

The examples below illustrate the invention without restricting it.

EXAMPLES

Example 1

100 g of commercially available blue pearlescent pigment based on TiO$_2$ coated mica with a fineness of 5-25 μm (Phoenix PX 2261, Eckart) were suspended in 300 ml of isopropanol and the suspension was brought to boiling temperature. With stirring, first 2.0 g of H$_2$O and then, over the course of one hour, a solution of 2.17 g of Ce(NO$_3$)$_3$ in 100 g of isopropanol were added. This was followed by addition of a solution of 0.45 g of ethylenediamine in 3.0 g of H$_2$O. Thereafter, over a period of 2 h, 10.6 g of tetraethoxysilane and 22 g of isopropanol were passed in continuously using a metering pump (Ismatec). Thereafter the suspension was allowed to react further for 6 h. Then 0.4 g of Dynasylan AMEO and 1.3 g of Dynasylan 9116 were added and the mixture was left to cool slowly. It was stirred at room temperature overnight and subjected to suction filtration the next day. The pigment filtercake was subsequently dried in vacuo at 80° C. The pigment had a theoretical Ce content of 0.7% by weight and an SiO$_2$ content of 3.0% by weight.

Example 2

100 g of commercially available blue pearlescent pigment based on TiO$_2$ coated mica with a fineness of 5-25 μm (Phoenix PX 2261, Eckart) were suspended in 900 g of water. Subsequently a solution of 2.30 g of SnCl$_4$*5H$_2$O in 45 ml of dilute hydrochloric acid was metered in at a rate of 2 ml/min, the pH being kept constant by simultaneous dropwise addition of 20% strength sodium hydroxide solution. After 30 minutes of subsequent stirring the solid was filtered off, washed with water and dried at 120° C. The dry, coated pigment was suspended in 300 ml of isopropanol and the suspension was brought to boiling temperature. With stirring, first 2.0 g of H$_2$O and then, over the course of one hour, a solution of 2.17 g of Ce(NO$_3$)$_3$×6H$_2$O in 100 g of isopropanol were added. This was followed by addition of a solution of 0.45 g of ethylenediamine in 8 g of H$_2$O. Thereafter, over a period of 2 h, 14.6 g of tetraethoxysilane and 20 g of isopropanol were passed in continuously using a metering pump (Ismatec).

Thereafter the suspension was allowed to react further for 6 h. Then 0.4 g of Dynasylan AMEO and 1.3 g of Dynasylan 9116 were added and the mixture was left to cool slowly. It was stirred at room temperature overnight and subjected to suction filtration the next day. The pigment filtercake was subsequently dried in vacuo at 100° C. for 6 h.

The pigment had a theoretical SnO$_2$ content of 1.0%, a cerium content of 0.7%, and an SiO$_2$ content of 4.2% by weight.

Comparative Example 3

Commercially available Exterior CFS Mearlin Super Blue 6303Z (10-40 μm) from Engelhard.

Comparative Example 4

Prepared as example 1, but without using aminosilane. Aftercoating took place with 1.3 g of Dynasylan 9116 only.

The inventive and comparative examples were subjected to various tests relating to weather stability and to UV stability. In the text below, the test methods are described and the results listed.

A Condensation Test

A number of pigment samples were incorporated into a water-based varnish system and the test applications were produced by spray coating. The basecoat was over-coated with a commercial 1K [one-component] clearcoat and then baked. These applications were tested in accordance with DIN 50 017 (constant condensation climate). The adhesive strength was tested by means of cross-cut in accordance with DIN EN ISO 2409 immediately after the end of the test and one hour later, in comparison with the unexposed sample. In this test, Gt 0 denotes no change and Gt 5 very severe change. The swelling behavior was assessed visually immediately following condensation exposure, in a method based on DIN 53230. Here, the index 0 denotes no change and the index 5 denotes very severe change. The blistering was assessed visually in accordance with DIN 53209. Here again, the relative evaluation scale ranges from 0 ("very good") to 5 ("very poor"). "m" denotes the frequency and "g" the size of the blisters. Finally the DOI (distinctness of image) was assessed visually. It may change substantially on the basis of the swelling events.

TABLE 1

Condensation and cross-cut tests

| | | Cross-cut | | | | DOI | |
|---|---|---|---|---|---|---|---|
| Sample | 0-specimen | 0 h | 1 h | Blistering | Swelling | 0 h | 1 h |
| Example 1 | Gt 0 | Gt 0 | Gt 0 | m1/g1 | 2 | 2 | 2 |
| Example 2 | Gt 0 | Gt 0 | Gt 0 | m1/g1 | 2 | 2 | 2 |
| Comparative example 3 | Gt 0 | Gt 0 | Gt 0 | m1/g1 | 2 | 2 | 1 |
| Comparative example 4 | Gt 1 | Gt 3 | Gt 2 | m2/g3 | 2 | 2– | 2 |

The inventive examples 1 and 2 are comparable in every respect with the prior-art comparative example 3, and pass the condensation test. Comparative example 4, where the aftercoating consisted merely of an alkylsilane (16 carbon atoms) without a functional group that attaches to the varnish system, however, is markedly poorer in terms of its adhesive strength in cross-cut, and fails the test.

With this sample, therefore, no further exposure tests, such as WOM test, were conducted either.

B WOM Test

The pigment samples were incorporated into a water-based varnish system and the test applications were produced by spray coating. The basecoat was overcoated with a commercial clearcoat and then baked. The accelerated weathering test took place in accordance with SAE-J 1960 in an Atlas Ci-65 A Xeno-test apparatus with water-cooled 6.5 kW xenon lamp. The determination of the $\Delta E^*$ values and also the gray scale classification took place in each case relative to the corresponding unexposed sample.

C UV Stability on Drawdowns

This test was carried out along the lines of the accelerated UV test described in EP 0 870 730 for determining the photochemical UV activity of $TiO_2$ pigments.

For this purpose, 1.0 g of the pearlescent pigment was dispersed in 9.0 g of a double-bond-rich melamine-containing varnish. Drawdowns were prepared on cardboard-backed paper, and were dried at room temperature. The drawdowns were divided and one of the two sections in each case was stored in the dark, as an unexposed specimen for comparison. Subsequently the samples were irradiated with UV-containing light (UV-A-340 lamp, irradiation level 1.0 $W/m^2/nm$) in a QUV apparatus from Q-Panel for 150 minutes. Immediately after the end of the test, calorimetric values of the exposed test specimens relative to the respective retained specimen were determined using a Minolta CM-508i colorimeter. The resultant $\Delta E^*$ values, calculated in accordance with the Hunter $L^*a^*b^*$ formula, are set out in tab. 2.

In the test, essentially a gray-blue discoloration of the $TiO_2$ layer of the pearlescent pigment in the drawdowns is observed, owing to Ti(III) centers formed under the influence of UV light. The condition for this to occur is that the electron hole has departed, in terms of space, from the $TiO_2$ and—as a result, for instance, of reaction with olefinic double bonds of the binder—is unable immediately to recombine with the remaining electron. Since a melamine-containing varnish layer significantly slows down the diffusion of water (vapor) and oxygen to the pigment surface, reoxidation of the titanium(III) centers takes place in a distinctly retarded fashion, so that the graying can be measured and the $\Delta E$ value can be employed as a measure of the light stability of the pigments. A greater numerical $\Delta E^*$ value for the exposed sample relative to the unexposed retained specimen, therefore, denotes lower light stability on the part of the pigment under investigation.

When this test is used in respect of the inventive examples, it is necessary to distinguish whether samples with or without organic surface modification (OSM) are used.

With an organic surface modification, the pigment surface is isolated at least partly from the reactive, unsaturated melamine system. Consequently, the redox reaction which is vital for the formation of the chromophoric Ti(III) centers cannot take place with the same efficiency and speed as in the case depicted first. Consequently, in the case of pigments with organic surface modification, a far lesser discoloration is inevitably found. This does not mean, however, that the UV-catalytic activity is low in this case. In all cases, however, the $\Delta E^*$ values for an inventive pearlescent pigment which has not undergone organic modification are somewhat higher, therefore, than for the samples aftertreated on the surface.

TABLE 2

WOM and UV drawdown test results

| | WOM test | | UV test | |
|---|---|---|---|---|
| Sample | $\Delta E^*$ | Gray scale | $\Delta E^*$ (without OSM) | $\Delta E^*$ (with OSM) |
| Example 1 | | | 1.4 | 0.9 |
| 500 h | 0.1 | 5 | | |
| 1000 h | 0.2 | 5 | | |
| 2000 h | 0.3 | 5 | | |
| 3000 h | 0.3 | 4-5 | | |
| 4000 h | 0.4 | 4-5 | | |
| Example 2 | 0.2 | 5 | 1.4 | 1.1 |
| 500 h | 0.2 | 5 | | |
| 1000 h | 0.3 | 5 | | |

TABLE 2-continued

WOM and UV drawdown test results

| Sample | WOM test | | UV test | |
|---|---|---|---|---|
| | ΔE* | Gray scale | ΔE* (without OSM) | ΔE* (with OSM) |
| 2000 h | 0.3 | 4-5 | | |
| 3000 h | 0.3 | 4-5 | | |
| 4000 h | | | | |
| Comparative example 3 (exterior CFS Mearlin Super Blue 6303Z) | | | — | 2.3 +/− 0.3 |
| 500 h | 0.4 | 5 | | |
| 1000 h | 0.5 | 5 | | |
| 2000 h | 0.8 | 4-5 | | |
| 3000 h | 0.8 | 4-5 | | |
| 4000 h | 1.0 | 4 | | |

OSM: Organic surface modification

If the color changes ΔE* in the WOM test for the blue pigments of inventive examples 1 and 2 are compared with that of the prior-art representative comparative example (tab. 2), lower values and hence better weather resistances are obtained. In particular, the light stabilities, determined on the basis of the drawdown test, are significantly better.

The pearlescent pigments of the invention are therefore able to improve the weather stability and UV stability, with an optimum layer sequence of first cerium oxide/hydroxide and then $SiO_2$, as compared with prior-art comparative examples.

UV Stability:

For closer investigation of the structure of the oxide layer and the effect of the $SiO_2$ layer thickness, further inventive and comparative examples were produced and investigated in a drawdown test for their UV stability. In this case an aftercoat was not applied, since aftercoating falsifies the UV test (see above).

Examples 5 and 6

100 g of commercially available blue pearlescent pigment based on $TiO_2$ coated mica with a fineness of 10-40 μm (Phoenix PX 1261, Eckart) were suspended in 300 ml of isopropanol and the suspension was brought to boiling temperature. With stirring, first 2.0 g of $H_2O$ and then, over the course of one hour, a solution of 0.93 g of $Ce(NO_3)_3 \times 6H_2O$ in 8 g of isopropanol were added. This was followed by addition of a solution of 0.45 g of ethylenediamine in 3.0 g of $H_2O$. Thereafter, over a period of 2 h, a defined amount of tetra-ethoxy-silane (see table 3) and 22 g of isopropanol were passed in continuously using a metering pump (Ismatec). Thereafter the suspension was allowed to react further for 6 h. It was stirred at room temperature overnight and subjected to suction filtration the next day. The pigment filtercake was subsequently dried in vacuo at 100° C. for 6 h.

Different amounts of $SiO_2$ were deposited in a similar way (see table 3).

Examples 7 and 8

For comparison, different protective layers with varying $SiO_2$ content were also produced, without cerium salts being deposited additionally.

Example 9

A comparative example with a cerium-containing protective layer (0.3% Ce content) was likewise produced, without $SiO_2$ being deposited additionally.

The ΔE* values of all of the examples were determined on drawdowns in the above-described UV stability test. The amounts of chemicals employed, theoretical protective layer component contents, and the ΔE* values are set out in table 3.

Examples 10 and 11 (Mixed Layer)

100 g of commercially available blue pearlescent pigment based on $TiO_2$ coated mica with a fineness of 10-40 μm (Phoenix PX 1261, Eckart) were suspended in 300 ml of isopropanol and the suspension was brought to boiling temperature. With stirring, first 2.0 g of $H_2O$ and then a solution of 0.45 g of ethylenediamine in 3.0 g of $H_2O$ were added. Thereafter, simultaneously over a period of 2 h, a solution of tetraethoxysilane (see table 3) in 100 g of isopropanol and a solution of 0.93 g of $Ce(NO_3)_3 \times 6H_2O$ in 100 g of isopropanol were passed in continuously using a metering pump (Ismatec). Subsequently the suspension was left to react further for 6 h. The mixture was stirred at room temperature overnight and subjected to suction filtration the next day. The pigment filtercake was subsequently dried in vacuo at 80° C.

Different amounts of $SiO_2$ were deposited in a similar way (see table 3).

Comparative Examples 12 and 13

Comparative examples 12 and 13 were prepared in accordance with the coating method described for examples 6 and 7, but here first the silicate compound and then the cerium salt were introduced and precipitated.

TABLE 3

UV drawdown test results

| Sample | Layer 1 | Layer 2 | Amount of tetraethoxy-silane used | ΔE* |
|---|---|---|---|---|
| Example 5 | 0.3% Ce | 1% $SiO_2$ | 3.47 g | 1.5 |
| Example 6 | 0.3% Ce | 2% $SiO_2$ | 6.94 g | 1.0 |
| Comparative example 7 | — | 1% $SiO_2$ | 3.47 g | 5.8 |
| Comparative example 8 | — | 2% $SiO_2$ | 6.94 g | 3.1 |
| Comparative example 9 | 0.3% Ce | — | — | 8.4 |
| Comparative example 10 | 0.3% Ce/ 1% $SiO_2$ | — | 3.47 g | 3.1 |
| Comparative example 11 | 0.3% Ce/ 2% $SiO_2$ | — | 6.94 g | 2.3 |
| Comparative example 12 | 1% $SiO_2$ | 0.3% Ce | 3.47 g | 6.0 |
| Comparative example 13 | 2% $SiO_2$ | 0.3% Ce | 6.94 g | 3.3 |

Table 3 clearly shows that a layer sequence of 1. cerium oxide/hydroxide and 2. $SiO_2$ brings the best UV stability. Pearlescent pigments protected only with $SiO_2$, and also pearlescent pigments protected only with cerium oxide/hydroxide, or the layer sequence 1. $SiO_2$, 2. cerium oxide/hydroxide, have significantly lower stabilities by comparison. Likewise, mixed layers of $SiO_2$ and cerium oxide exhibit a lower stabilizing effect. These findings are a clear indication of the synergetic effects of a combined, successively precipitated cerium oxide and $SiO_2$ coating, which only become effective if the cerium oxide/hydroxide layer is precipitated first and only then is the silicon oxide layer precipitated.

What is claimed is:

1. A pearlescent pigment with a platelet-shaped substrate comprising metal oxide and having a first and a second protective layer, said metal oxide having a refractive index of greater than 1.8, there being on the platelet-shaped substrate a first protective layer comprising cerium oxide, cerium hydroxide, or a mixture thereof and a second protective layer of SiO$_2$, applied to which is an organic chemical aftercoat comprising at least one silane having at least one functional bond group and at least one silane without a functional bond group, it being possible for metal oxide layers other than cerium oxide and SiO$_2$ to be disposed between the first and the second protective layer, wherein the silane without a functional bond group is an alkylsilane having the structural formula (I):

$$R_{(4-z)}Si(X)_z \quad (I)$$

where z is an integer from 1 to 3;

R is a substituted or unsubstituted, unbranched or branched alkyl chain having 10 to 22 carbon atoms, and X is a halogen and/or alkoxy group, or wherein the silane without a functional bond group has the structural formula (II):

$$(R^1-X-[A-Y]_n-B)_{(4-z)}Si(OR^2)_z \quad (II)$$

where n=1 to 100;

z is an integer from 1 to 3;

R$^1$ is a straight- or branched-chain alkyl having 1 to 12 carbon atoms, which may be substituted by halogens; an aryl having 6 to 12 carbon atoms: or an aryl having 6 to 12 carbon atoms, which is substituted by alkyl having 1 to 6 carbon atoms, halogen atoms, or a combination thereof;

R$^2$ is straight or branched-chain alkyl having 1 to 6 carbon atoms;

A and B independently of one another are a divalent group consisting of straight- or branched-chain alkylene having 1 to 12 carbon atoms; an arylene having 6 to 12 carbon atoms; or an arylene having 6 to 12 carbon atoms, which is substituted by alkyl having 1 to 6 carbon atoms, halogen atoms, or a combination thereof; and X and Y independently of one another are O or S.

2. The pearlescent pigment as claimed in claim 1, wherein the organic chemical aftercoat is joined covalently to the SiO$_2$ layer.

3. The pearlescent pigment as claimed in claim 1, wherein the SiO$_2$ content of the pigment is 0.5% to 8% by weight, based on the total weight of the pigment.

4. The pearlescent pigment as claimed in claim 1, wherein R$^1$ and R$^2$ are selected independently of one another from the group consisting of methyl, ethyl, n-propyl, isopropyl, n-butyl, isobutyl, tert-butyl, phenyl, biphenylyl, naphthyl, and mixtures thereof.

5. The pearlescent pigment as claimed in claim 1, wherein A and B are selected independently of one another from the group consisting of ethylene, propylene, 1-butylene, 2-butylene, phenylene, phenylene substituted by alkyl having 1 to 6 carbon atoms, and mixtures thereof.

6. The pearlescent pigment as claimed in claim 1, wherein the silanes are present in pure form with a defined n or in mixtures with different n.

7. The pearles cent pigment as claimed in claim 1, wherein the at least one functional bond group is selected from the group consisting of acrylate, methacrylate, vinyl, amino, cyanate, isocyanate, epoxy, hydroxyl, thiol, ureido, carboxyl groups, and mixtures thereof.

8. The pearlescent pigment as claimed in claim 1, wherein the silane having at least one functional bond group is an aminosilane.

9. The pearlescent pigment as claimed in claim 1, wherein the fraction of cerium is 0.05% to 3.0% by weight, based in each case on the total weight of the pigment.

10. The pearlescent pigment as claimed in claim 1, wherein the fraction of the organic chemical aftercoat is between 0.1% and 6% by weight, based on the total weight of the pigment.

11. The pearlescent pigment as claimed in claim 1, wherein the first protective layer further comprises SiO$_2$.

12. The pearlescent pigment as claimed in claim 1, wherein the platelet-shaped substrate comprises one or more metal oxide layers.

13. The pearlescent pigment as claimed in claim 1, wherein disposed between the first protective layer and the second protective layer of SiO$_2$ there are disposed further layers.

14. The pearlescent pigment as claimed in claim 1, wherein the platelet-shaped substrate is selected from the group consisting of oxide coated mica flakes, oxide coated glass flakes, oxide coated alumina flakes, oxide coated SiO$_2$ flakes, bismuth oxychloride flakes, pure TiO$_2$ flakes, and mixtures thereof, wherein the oxide coating comprises a layer of TiO$_2$; a layer of iron oxide; a first layer of TiO$_2$ and a second layer of iron oxide; or a first layer of iron oxide and a second layer of TiO$_2$.

15. The pearlescent pigment as claimed in claim 1, wherein the substrate comprises a layer of TiO$_2$.

16. An article provided with a coating comprising pearlescent pigment as claimed in claim 1.

17. The article as claimed in claim 16, which is a vehicle body or an architectural facing.

18. The pearlescent pigment as claimed in claim 1, wherein the alkylsilane is applied using an alkylsilane having the formula R$_{(4-z)}$Si(X)$_z$, R being a substituted or unsubstituted, unbranched or branched alkyl chain having 10 to 22 carbon atoms, X being a halogen group, an alkoxy group, or a combination thereof, and z being an integer from 1 to 3.

19. The pearlescent pigment as claimed in claim 9, wherein the fraction of cerium is 0.1% to 1.0% by weight, based in each case on the total weight of the pigment.

20. The pearlescent pigment as claimed in claim 10, wherein the fraction of the organic chemical aftercoat is between 0.4% and 2% by weight, based on the total weight of the pigment.

21. The pearlescent pigment as claimed in claim 12, wherein the one or more metal oxide layers comprise tin oxide.

22. The pearlescent pigment as claimed in claim 12, wherein the platelet-shaped substrate is calcined.

23. The pearlescent pigment as claimed in claim 13, wherein the further layers comprise metal oxide layers.

* * * * *